United States Patent
Kim et al.

(10) Patent No.: US 7,450,534 B2
(45) Date of Patent: Nov. 11, 2008

(54) TEMPORARY MOBILE GROUP IDENTIFIER GENERATION AND DISTRIBUTION METHOD

(75) Inventors: Soeng-Hun Kim, Suwon-shi (KR);
Sung-Ho Choi, Suwon-shi (KR);
Chunying Sun, Beijing (CN);
Xiaoqiang Li, Beijing (CN)

(73) Assignees: Samsung Electronics Co., Ltd (KR);
Beijing Samsung Telecom R&D Center (CN)

( * ) Notice: Subject to any disclaimer, the term of this patent is extended or adjusted under 35 U.S.C. 154(b) by 362 days.

(21) Appl. No.: 10/524,705

(22) PCT Filed: Aug. 12, 2003

(86) PCT No.: PCT/KR03/01623

§ 371 (c)(1),
(2), (4) Date: Nov. 3, 2005

(87) PCT Pub. No.: WO2004/015944

PCT Pub. Date: Feb. 19, 2004

(65) Prior Publication Data

US 2006/0109812 A1    May 25, 2006

(30) Foreign Application Priority Data

Aug. 13, 2002  (CN) ............................. 02 1 29786

(51) Int. Cl.
*H04H 20/71*  (2008.01)
(52) U.S. Cl. ................... 370/312; 370/352; 370/390; 455/3.02

(58) Field of Classification Search ................ 455/458, 455/466, 3.02; 370/329, 328, 349, 352, 312, 370/390
See application file for complete search history.

(56) References Cited

U.S. PATENT DOCUMENTS

| 5,729,537 | A | 3/1998 | Billström | |
|---|---|---|---|---|
| 6,600,928 | B1 | 7/2003 | Ahya et al. | |
| 7,149,195 | B2 * | 12/2006 | Kall et al. | 370/328 |
| 2002/0086685 | A1 | 7/2002 | Wallentin et al. | |
| 2005/0007969 | A1 * | 1/2005 | Hundscheidt et al. | 370/312 |
| 2005/0151840 | A1 * | 7/2005 | Hurtta | 348/61 |

OTHER PUBLICATIONS

3GPP TR 23.846 1.0.0, 3rd Generation Partnership Project; Technical Specification Group Services and System Aspects; Multimedia Broadcast/Multicast Service; Architecture and Functional Description☐☐Release 6, (Jan. 2002) Section 6 and 7.*

* cited by examiner

*Primary Examiner*—Vincent P Harper
*Assistant Examiner*—Dung Lam
(74) *Attorney, Agent, or Firm*—The Farrell Law Firm, PC

(57) ABSTRACT

A method for creating and assigning TMGI, comprising steps of: sending a message to a SGSN when an UE joining a MBMS service group; if a MBMS TMGI has been added to SGSN records, the SGSN directly replying to the UE with the TMGI corresponding to a service; if there is no record for this service in the SGSN, the SGSN sending a message to the GGSN, and if the TMGI corresponding to this service is created by the GGSN, the GGSN sending it to the SGSN; if there is no record in the GGSN and a TMGI is created by the GGSN, the GGSN creates a TMGI for the MBMS service; e. the SGSN sending the TMGI received from the GGSN to the RNC. f. The UE receiving signal from the RNC by using the TMGI.

15 Claims, 8 Drawing Sheets

TEMPORARY MOBILE GROUP IDENTIFIER GENERATION AND DISTRIBUTION METHOD

BACKGROUND OF THE INVENTION

1. Field of the Invention

This invention relates to Multimedia Broadcast/Multicast Service (hereinafter referred to as MBMS), and in particular to Method or creating and assigning Temporary Moving Group Identifier (TMGI).

2. Description of the Prior Art

MBMS is a new service under standardization by $3^{rd}$ Generation Partnership Project (simplified as 3GPP). MBMS service is an unidirectional point-to-multipoint (p-t-m) service, whose most remarkable characteristic is that it can make use of radio resources and network resources efficiently. In this service, multimedia data sent from data source are transferred to a plurality of users via transmission network. This kind of p-t-m service can save network resources. MBMS service is mainly used in radio communication network system, e.g. Wideband Code Division Multiple Access (hereinafter referred to as WCDMA), Global System of Mobile Communication (hereinafter referred to as GSM), etc. MBMS data transmission basically includes following steps: data source transmission, middle network transmission, destination cell on-the-air transmission and user receiving. FIG. 1 is the logical figure for network devices that can provide MBMS service, in which MBMS actually makes use of General Packet Radio Service (hereinafter referred to as GPRS) as core transmission network. As shown in FIG. 1, Broadcast/Multicast Service Centre (hereinafter referred to as BM-SC) is the data source for MBMS data transmission; Gateway GPRS Supporting Node (hereinafter referred to as GGSN) is used to connect GRPS network with external network, such as INTERNET, which is used to connect BM-SC in MBMS service and to send MBMS data to specific Service GPRS Supporting Node (hereinafter referred to as SGSN); Cell Broadcast Centre (hereinafter referred to as CBC) is the data resource of cell broadcast. Through interconnecting CBC with BM-SC in MBMS, CBC can provide MBMS service announcement function; SGSN is used to perform access control on UE as well as mobility management, and sends MBMS data from GGSN to specific Radio Network Controller (hereinafter referred to as RNC) at the same time; RNC is used to control a group of base stations (hereinafter referred to as NODE B) and sends multimedia data to specific NODE B; NODE B (base station) establishes air physical channel for MBMS service in a certain cell under the control of RNC; Terminal User Equipment (hereinafter referred to as UE) is the terminal equipment for MBMS data reception.

FIG. 2 gives the whole process from service announcement, joining, service notification, and radio bearer set up till user's final leaving in MBMS service.

000 Subscription—setting up the connection between user and service provider, and authorizing user to receive relevant MBMS service.

001 Service announcement—notifying user of services to be provided. For example, the system will rebroadcast-a football match in Beijing at 7:00 p.m.

002 Joining—indicating that user joins a group, i.e. the user informs the network that he or she is willing to receive this multicast service.

003 MBMS multicast mode bearer set up—setting up network resources for MBMS data transfer.

004 MBMS notification—notifying user of MBMS data transfer to be performed immediately.

005 Data transfer—indicating the process of transferring MBMS service data to user.

006 MBMS multicast mode bearer release—indicating the releasing of network resources after MBMS service data transfer finishes.

007 leaving—corresponding to 002 joining, which indicates that a user is leaving a group, i.e. the user doesn't want to receive the data of a certain service any more.

As MBMS service is provided to a plurality of users simultaneously, a paging block is easy to happen during the process of MBMS notification. A Temporary Moving Group Identifier (hereinafter referred to as TMGI) is assigned to users of the same group, which can solve the deficiency of one-by-one paging for a plurality of users at the same time. TMGI is assigned by SGSN. Before MBMS data transfer, TMGI is transferred to UE via GPRS attach, routing area update or group division—Packet-Temporary Moving Subscriber Identifier (hereinafter referred to as P-TMSI) re-assignment process. The first assignment shall be performed when user joins the MBMS service. Different multicast service has different TMGI identifier in the same SGSN. TMGI can prevent from paging block on radio interface.

An Iu-Flex is the new interface between RNC and core network (hereinafter referred to as CN). The Iu-Flex is introduced to effectively make use of network hardware resources and to reduce signaling interaction due to location update. When applied into MBMS system, as shown in FIG. 5, a RNC connects with a plurality of SGSNs at the same time. And the serving SGSNs of UE1, UE2 and UE3 are different. As the serving SGSN of UE 1 is SGSN1 and that of UE2 and UE3 is SGSN2, MBMS data source of UE1 is different from that of UE2 and UE3. In the situation of MBMS notification, two SGSNs send MBMS paging message to RNC simultaneously A plurality of SGSNs shall assign the same TMGI for the same MBMS service so that RNC can detect that a plurality of MBMS notifications are for the same MBMS service. Besides TMGI, IP multicast address can also be used to notify RNC that multiple MBMS notifications sent from SGSN are for the same service. IP multicast address is told to UE during the period of service announcement or service discovery.

TMGI is assigned by SGSN, and SGSN doesn't know the TMGI assigned by other SGSN for this service. If a plurality of SGSNs assign different TMGIs for the same service, RNC needs to send a plurality of copies of paging for the same service when the plurality of MBMS notifications are sent to different users in the same RNC. This may not only result in waste of resources but also result in confusion at RNC. Accordingly, when Iu-Flex exists, it is improper to assign TMGI by SGSN and it is difficult to guarantee that the plurality of SGSNs may assign the same TMGI for the same service. If RNC uses IP multicast address and service is not distinguished by TMGI, the above problem can be solved, but which makes it necessary for paging message to carry TIP address when RNC sends paging to user. IPv6 address has 128 bits, which results in additional overheads when it is transmitted on air interface. If IP address is really adopted as paging identifier, it means that the paging identifier is consistent all over the world, which is unnecessary and results in management confusion.

SUMMARY OF THE INVENTION

An object of this invention is to provide a method for creating and assigning TMGI.

According to one aspect of the invention, a method for creating and assigning TMGI comprising steps of:

a) sending a message to a serving GPRS Supporting Node (SGSN) when an UE joining a Multimedia Broadcast/Multicast Service (MBMS) group;
b) if a MBMS TMGI has been added into the SGSN records, the SGSN directly replying to the UE with the TMGI corresponding to the service;
c) if there is no record for this service in the SGSN, the SGSN sending a message to a Gateway GPRS Supporting Node (GGSN), and if the GGSN has the TMGI corresponding to this service, the GGSN sending it to the SGSN;
d) if there is no record for this service in the GGSN, the GGSN creating a TMGI for the MBMS service and transfers it to the SGSN;
e) the SGSN sending a TMGI received from the GGSN to a radio network controller (RNC);
f) the RNC transmitting the TMGI to the UE; and
g) the UE receiving signal from the RNC by using the TMGI.

According to another aspect of the invention, a method for creating and assigning TMGI comprising steps of:
a) sending a message to a serving GPRS Supporting Node (SGSN) when an UE joining a Multimedia Broadcast/Multicast Service (MBMS) group;
b) if a MBMS TMGI corresponding to the service has been added to the SGSN records, the SGSN directly replying to the UE with the TMGI corresponding to the service;
c) if there is no record for this service in the SGSN, the SGSN sending a message including the newly created TMGI to a Gateway GPRS Supporting Node (GGSN), the GGSN then sending a TMGI corresponding to this service to the SGSN to replace the TMGI created by the SGSN;
d) if there is no record for this service in the GGSN, the GGSN saving the TMGI created by the SGSN for the MBMS service and mapping it with EP multicast address;
e) the SGSN sending the TMGI received from the GGSN to a RNC;
f) the RNC transmitting the TMGI to the UE; and
g) the UE receiving signal from the RNC by using the TMGI.

According to still another aspect of the invention, a method for creating and assigning TMGI comprising steps of:
a) sending a message to a serving GPRS Supporting Node (SGSN) when an UE joining a Multimedia Broadcast/Multicast Service (MBMS) group;
b) if a MBMS TMGI has been added to SGSN record, the SGSN directly replying to the UE with the TMGI corresponding to the service;
c) if there is no record for this service in the SGSN, the SGSN sending a message to a Gateway GPRS Supporting Node (GGSN) and then the GGSN sending a response to the SGSN;
d) the SGSN creating a TMGI for this service and responding to the UE with this TMGI;
e) the SGSN sending a message to other SGSNs to notify them of the corresponding relation between the MBMS service and the TMGI;
f) the UE receiving signal from the RNC by using the TMGI.

BRIEF DESCRIPTION OF THE DRAWINGS

The above and other features and advantages of the present invention will be more apparent from the following detailed description taken in conjunction with the accompanying drawings, in which identical components are indicated by identical reference numbers and symbols throughout the several views.

DETAILED DESCRIPTION OF THE PREFERRED EMBODIMENTS

TMGI can be created by GGSN. TMGI is transferred from GGSN to SGSN while SGSN applies for joining MBMS multicast group for the first time. RNC obtains TMGI corresponding to a certain service when RNC receives MBMS notification from SGSN, which is transferred by SGSN. When UE joins the MBMS service multicast group, SGSN designates a TMGI for the service to UE.

If TMGI is created by SGSN, SGSN creates it while SGSN applies for joining the MBMS group for the first time and informs GGSN of the same. If GGSN fails to save the TMGI for this service, it will use this TMGI as the identifier of the service. If GGSN has recorded TMGI corresponding to this service, it will inform SGSN of this in the response. Thus, it guarantees that TMGI for the same and one service in a pool is consistent, which solves the problem resulting from Iu-Flex's introduction.

If TMGI is created by SGSN, SGSN notifies other SGSNs in the same pool after finishing assignment. And other SGSNs saves the mapping relation between TMGI and MBMS service. When other UE requests this MBMS service, all SGSNs assign the same TMGI for the same and one service. Thus, it guarantees that TMGI for the same and one service in a pool is consistent, which solves the problem resulting from Iu-Flex's introduction.

When user decides to receive a certain MBMS service, it initiates MBMS service request to RNC. During the request process, TMGI can be used to identify MBMS service so that RNC knows which service the UE is requesting. The message modification concerned is initial direct transmission, in which an information element, i.e. TMGI, is added to the message. Service request is still included in original information element of non-access layer message.

The mapping relation between a TMGI and an IP multicast address is transferred on the interface between SGSN and SGSN. A new message can be used to update MBMS context request. Updating MBMS context response finishes response message.

The message of updating MBMS context request includes:
TMGI;
IP Multicast address.

The message of updating MBMS context response includes:
TMGI.

Figure 1:
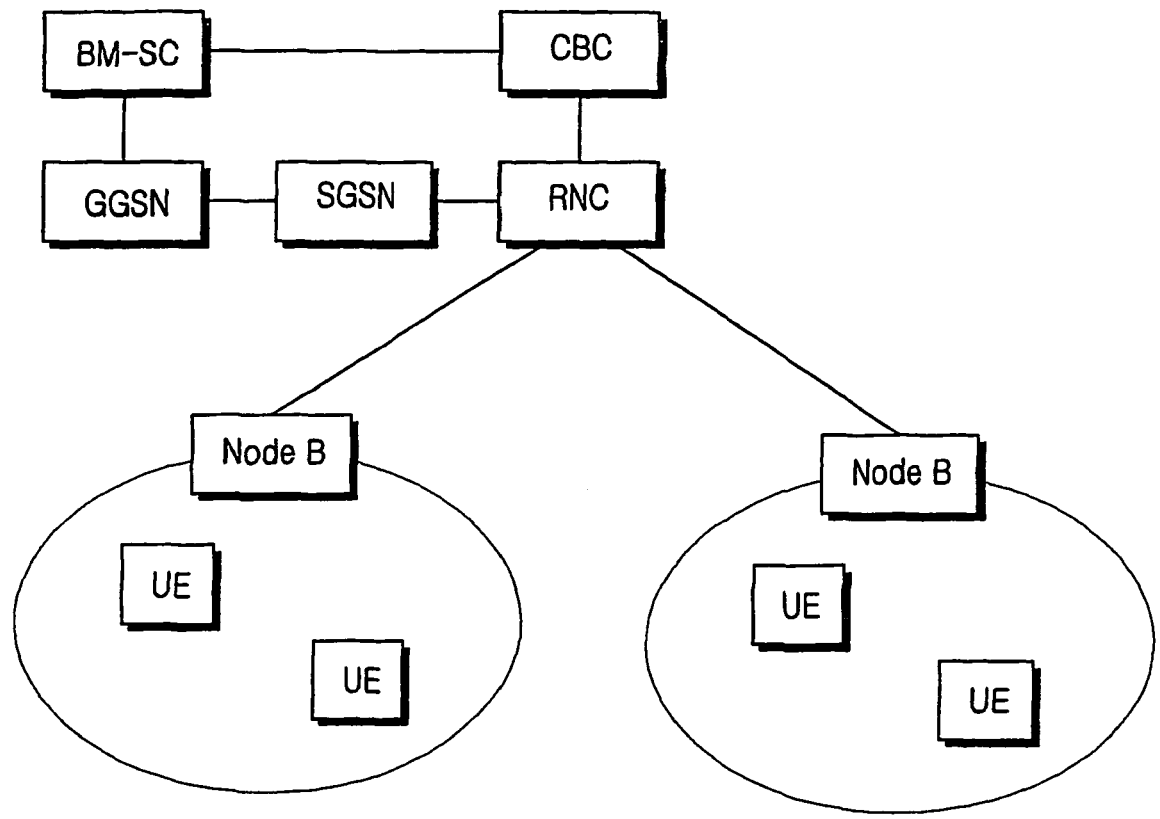
FIG. 1 is the logic figure for network devices which provides MBMS service.
Figure 2:
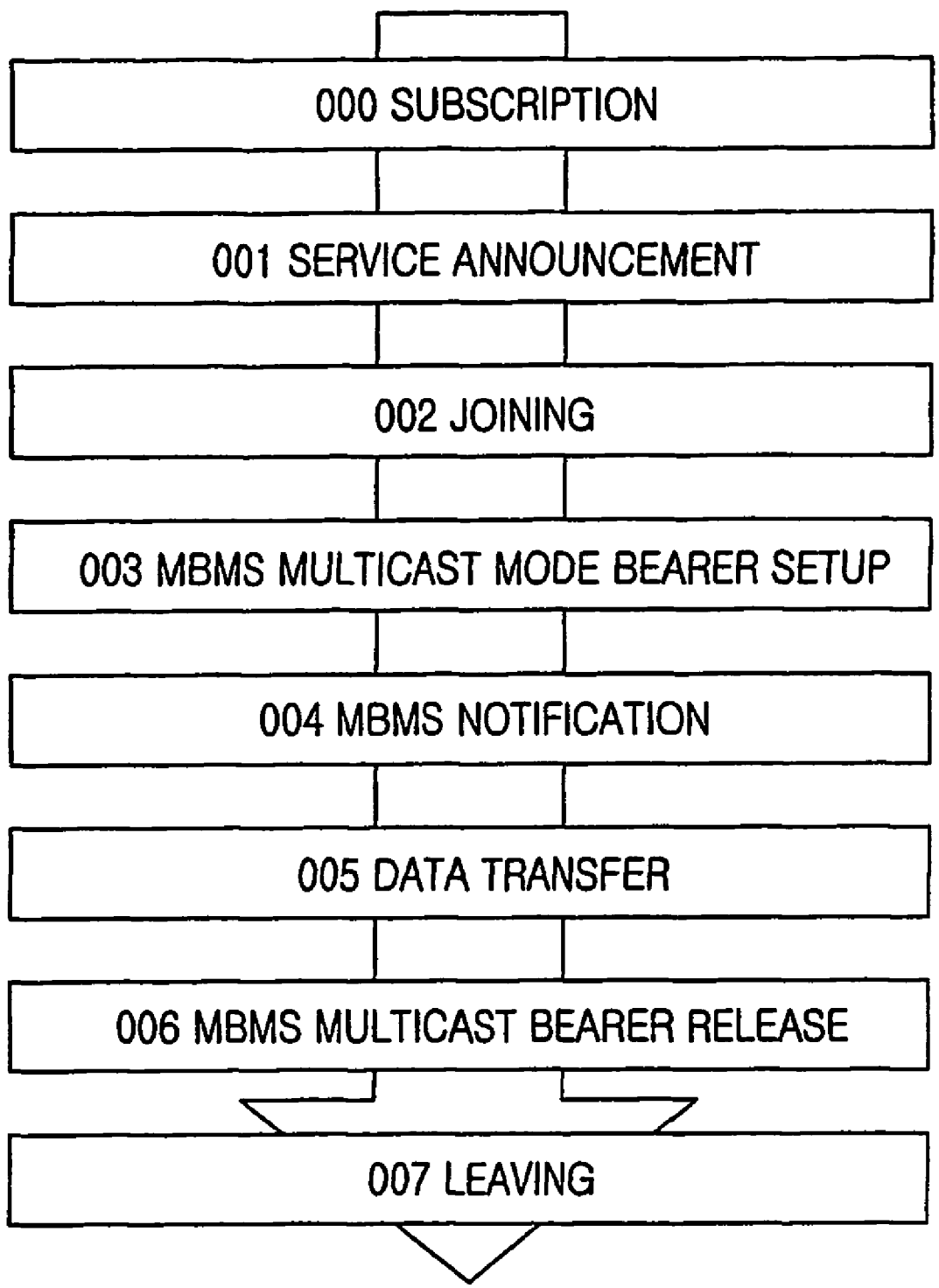
FIG. 2 is the flowchart of MBMS multicast service.
Figure 3:
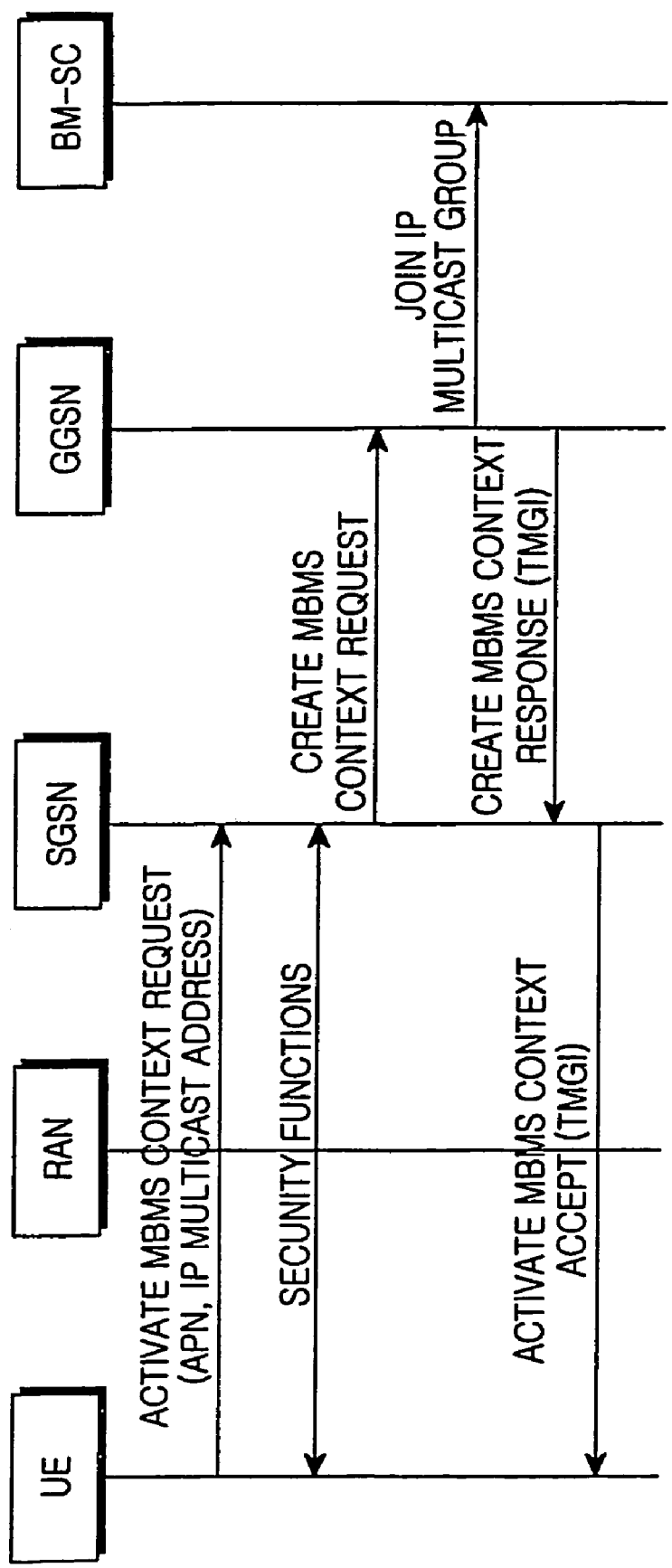
FIG. 3 is the flowchart of creating TMGI by GGSN.

FIG. 3 is the flowchart of creating TMGI by GGSN; When the first UE joins a multicast group, it shall send the request of activating MBMS context to SGSN, which includes access point name APN and IP multicast address that identify this service. When SGSN receives a request from the user, it checks the service identifier, i.e. APN and IP multicast address. If the MBMS group has been added to SGSN records, SGSN directly replies to UE with a message of activating MBMS context accept after security authentication is passed by. This message includes the TMGI corresponding to this service. UE may associate this TMGI with service identifier requested by it so that TMGI can be used afterwards to identify the unique MBMS service.

If there is no record for this service in the SGSN, i.e. SGSN hasn't created context for this service. SGSN may send the created MBMS context request message to GGSN, which carries APN and IP multicast address to inform SGSN which MBMS service it wants to join. After GGSN receives this message, it checks if it has joined the IP multicast group identified by the IP multicast address; If yes, GGSN transfers TMGI corresponding to this service to SGSN in creating MBMS context response. SGSN associates this TMGI with different service identifier requested by it so that the TMGI can be used afterwards to identify the unique MBMS service.

If there is no record for this service in GGSN, i.e. GGSN hasn't created context for this service, GGSN may apply to join this IP multicast group that is identified by IP multicast address. After joining the group successfully, GGSN creates a TMGI for this MBMS service and map it with IP multicast address so that TMGI can be used afterwards to identify the unique MBMS service.

Figure 6:
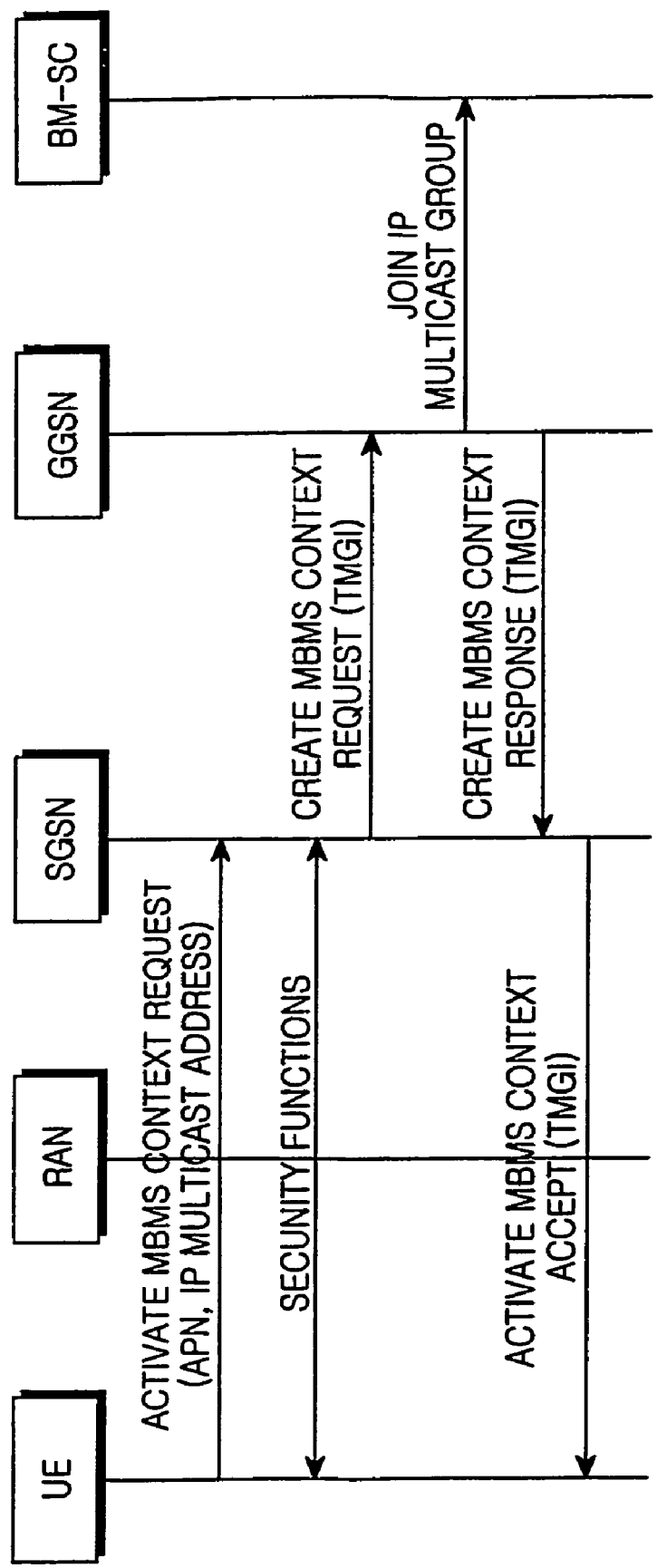
FIG. 6 is the flowchart of the situation when SGSN creates TMGI and GGSN assists in synchronization.

FIG. 6 is the flowchart of the situation when SGSN creates TMGI and GGSN assists in synchronization; When a user applies to join the MBMS group, the first UE sends context request of activating MBMS to SGSN, which includes access point name APN and IP multicast address that identify the service. When SGSN receives a request from the user, it checks the service identifier, i.e. APN and IP multicast address. If the MBMS has been added to SGSN record, SGSN directly replies to UE with a message of activating MBMS context accept after security authentication is passed by. This message may include the TMGI corresponding to this service. UE associates this TMGI with service identifier requested by it so that the TMGI can be used afterwards to identify the unique MBMS service.

If there is no record for this service in the SGSN, i.e. SGSN hasn't created context for this service, SGSN sends a message of creating MBMS context request to GGSN, which carries the TMGI created by this SGSN as well as APN and IP multicast address to inform GGSN which MBMS service it wants to join. After GGSN receives this message, it checks if it has joined the IP multicast group identified by the IP multicast address; If yes, GGSN transfers TMGI corresponding to this service to SGSN in creating MBMS context response to replace the TMGI created by the SGSN. SGSN associates this TMGI transferred from GGSN with service identifier requested by it so that TMGI can be used afterwards as the unique identifier for the MBMS service.

If there is no record for this service in GGSN, i.e. GGSN hasn't created context for this service, GGSN applies to join this IP multicast group that is identified by IP multicast address. After joining the group successfully, GGSN saves the TMGI created by SGSN for this MBMS service and map it with IP multicast address so that it can be used afterwards to identify the unique MBMS service.

Figure 7:
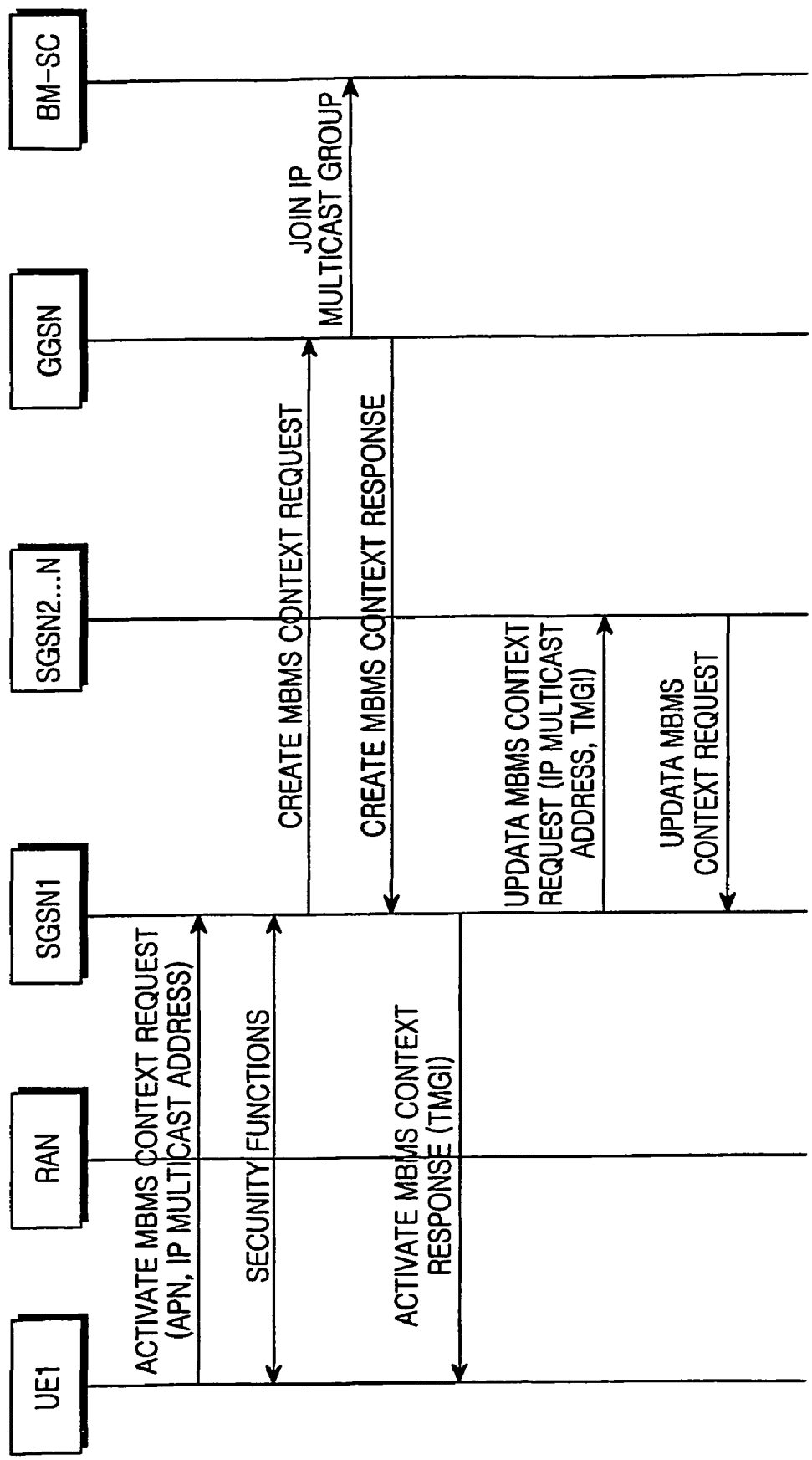
FIG. 7 is the flowchart of the situation when SGSN creates TMGI and SGSN assists in synchronization.

FIG. 7 is the flowchart of the situation when SGSN creates TMGI and SGSN assists in synchronization; When a user applies to join a MBMS group, UE sends a request of activating MBMS context to SGSN, which includes access point name APN and IP multicast address that identify the service. When SGSN receives a request from the user, it checks the service identifier, i.e. APN and IP-multicast address. If the MBMS has been added to SGSN records, SGSN directly replies to UE with a message of activating MBMS context accept after security authentication is passed by. This message includes the TMGI corresponding to this service. UE associates this TMGI with different service identifier requested by it so that the TMGI can be used afterwards to identify the unique MBMS service.

If there is no record for this service in the SGSN, i.e. SGSN hasn't created context for this service, SGSN sends a message of creating MBMS context request to GGSN, which informs GGSN of which MBMS service it wants to join. After GGSN receives this message, it checks if it has joined the IP multicast group identified by the IP multicast address; If yes, GGSN sends a response of creating MBMS context to SGSN. SGSN creates a TMGI for this service so that afterwards it can be used as the unique identifier for MBMS service. SGSN sends a updating MBMS context request message to other SGSNs in the same pool to inform them of this TMGI and corresponding IP multicast address of MBMS service so that other SGSNs can save this mapping relation. When an UE activates MBMS service via these SGSNs, it uses this TMGI.

If there is no record for this service in GGSN, i.e. GGSN hasn't created context for this service, GGSN applies to join this IP multicast group that is identified by IP multicast address.

Figure 8:
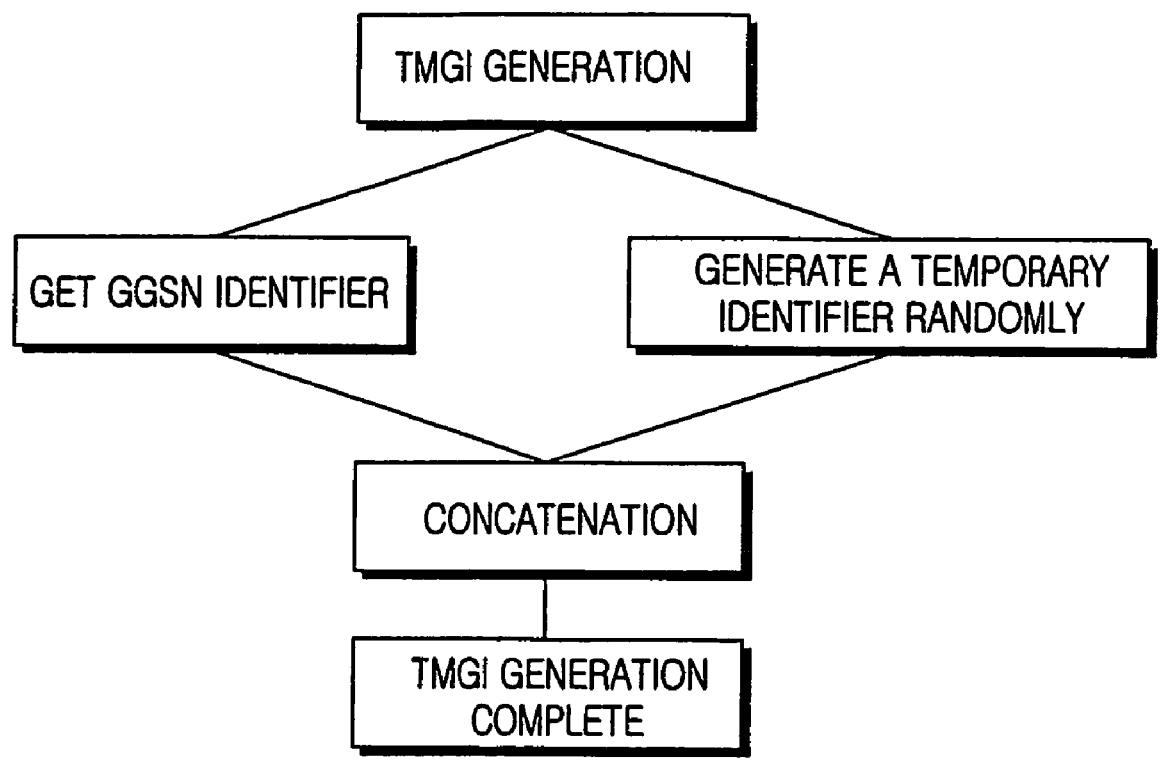
FIG. 8 is the process of creating TMGI.

FIG. 8 is the process of creating TMGI. When TMGI is created by GGSN, GGSN randomly creates a temporary identifier and associates it with GGSN identifier to form a complete TMGI. For example, TMGI is a 6-bit binary number. If the identifier of GGSN1 is 00 and the temporary identifier randomly created is 0010, then TMGI is 000010. If the identifier of GGSN3 is 10 and the temporary identifier randomly created is 0100, then TMGI is 100100. Bits number of TMGI and identifier of GGSN are determined by parameter configuration of the system.

When TMGI is created by SGSN, SGSN randomly creates a temporary identifier and associates it with GGSN identifier to form a complete TMGI. For example, TMGI is a 6-bit binary number. If the identifier of GGSN1 recorded in SGSN is 00 and the temporary identifier randomly created is 0010, then TMGI is 000010. If the identifier of GGSN3 recorded in SGSN is 10 and the temporary identifier randomly created is 0010, then TMGI is 100100. Bits number of TMGI and identifier of GGSN are determined by parameter configuration of the system. GGSN identifiers in configurations of all SGSNs of the same pool are the same one.

Figure 4:
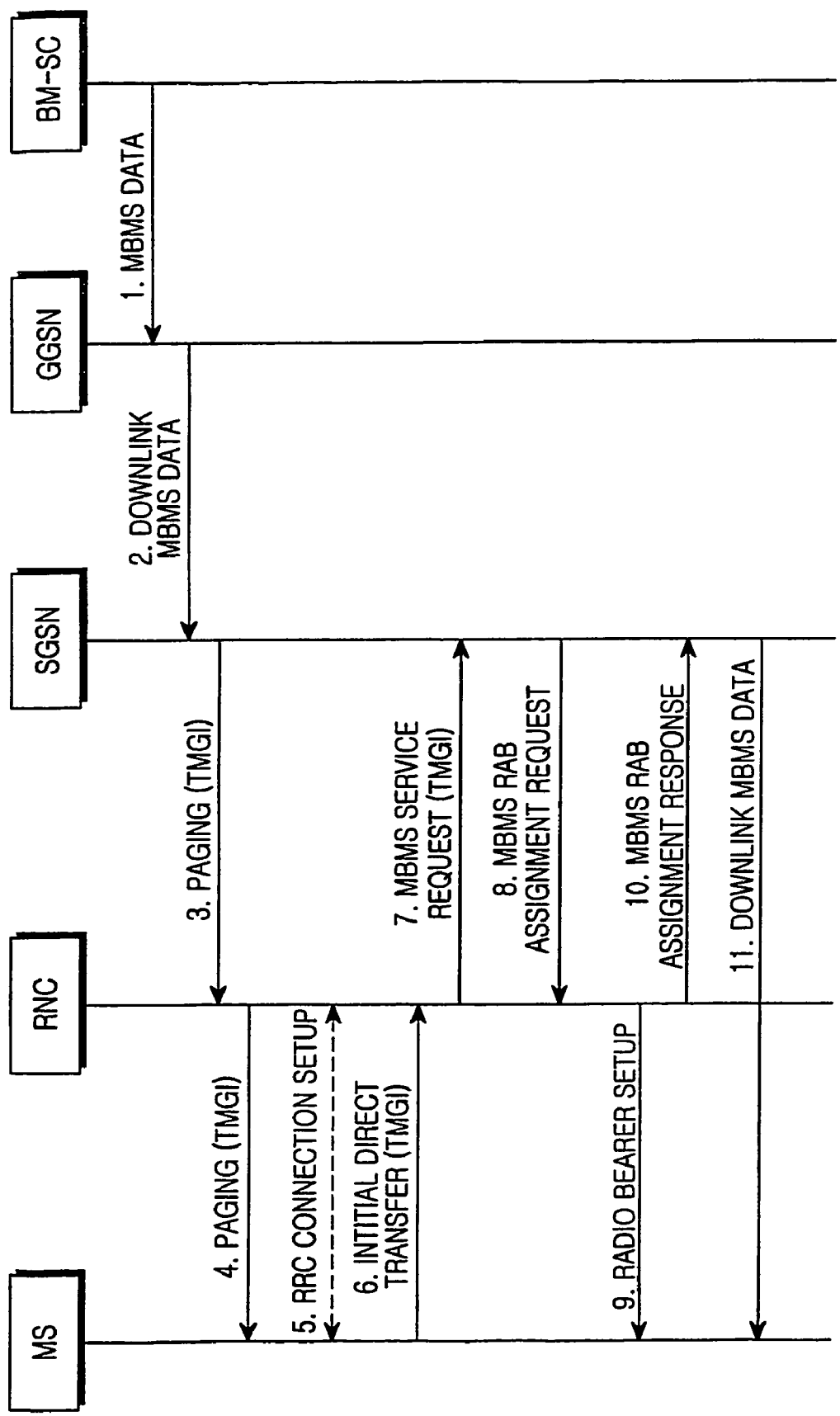
FIG. 4 is the flowchart of MBMS radio access bearer setup.
Figure 5:
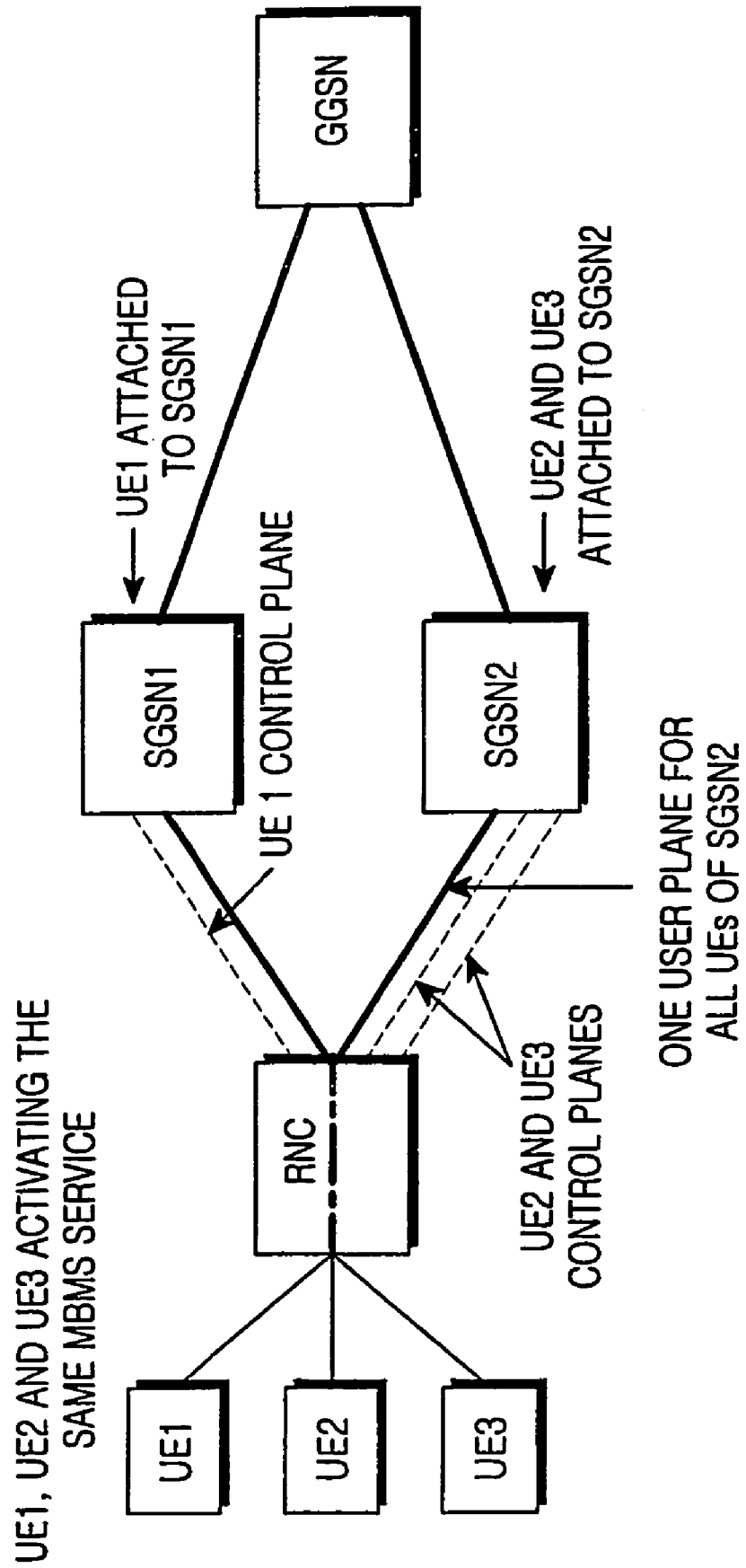
FIG. 5 is an example of MBMS Iu-Flex.

FIG. 4 shows the process of MBMS radio access bearer set up. After SGSN receives MBMS data, it sends paging message to RNC, which includes TMGI information. When RNC receives this information, it calculates the time spent for paging UE by making use of TMGI. After RNC receives any service request sent by UE, it decides to send a service request to SGSN by using the TMGI included in the service request. Furthermore, SGSN indicates RNC to set up radio access bearer and radio bearer between RNC and UE.

TMGI shall be included in the initial direct transmission of RRC message. After RNC receives this message, it firstly checks the MBMS service applied for by UE based on TMGI. RNC adds 1 to the number of the service's users, and then RNC forwards the message to SGSN as the response to the paging.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for creating and assigning Temporary Moving Group Identifier (TMGI), comprising the steps of:
    a) sending a message to a serving GPRS Supporting Node (SGSN) When an LIE joining a Multimedia Broadcast/Multicast Service MBMS group;
    b) if a MBMS TMGI has been added into the SGSN records, the SGSN directly replying to the LIE with the TMGI corresponding to the service;
    c) if there is no record for this service in the SGSN, the SGSN sending a message to a Gateway GPRS Supporting Node (GGSN), and if the GGSN has the TMGI corresponding to this service, the GGSN sending it to the SGSN;
    d) if there is no record for this service in the GGSN, the GGSN creating a TMGI for the MBMS service and transfers it to the SGSN;
    e) the SGSN sending a TMGI received from the GGSN to a radio network controller (RNC);
    f) the RNC transmitting the TMGI to the LIE; and
    g) the UE receiving signal from the RNC by using the TMGI.

2. The method as claimed in claim 1, further comprising the steps of: after the RNC receiving TMGI,
    h) forwarding the message to the SGSN.

3. The method as claimed in claim 2, the RNC adds 1 to the number of the service's users.

4. The method as claimed in claim 2, the TMGI is included in a initial direct transmission of RNC message.

5. The method as claimed in claim 1, the creating of the TMGI comprising the steps of:
    creating a temporary identifier;
    obtaining a GGSN identifier;
    associating the GGSN identifier with the temporary identifier.

6. A method for creating and assigning Temporary Moving Group Identifier (TMGI), comprising the steps of:
    a) sending a message to a serving GPRS Supporting Node (SGSN) when an LIE joining a Multimedia Broadcast/Multicast Service (MBMS) group;
    b) if a MBMS TMGI corresponding to the service has been added to the SGSN records, the SGSN directly replying to the UE with the TMGI corresponding to the service;
    c) if there is no record for this service in the SGSN, the SGSN sending a message including the newly created TMGI to a Gateway GPRS Supporting Node (GGSN), the GGSN then sending a TMGI corresponding to this service to the SGSN to replace the TMGI created by the SGSN;
    d) if there is no record for this service in the GGSN, the GGSN saving the TMGI created by the SGSN for the MBMS service and mapping it with IP multicast address;
    e) the SGSN sending the TMGI received from the GGSN to a RNC;
    f) the RNC transmitting the TMGI to the UE; and
    g) the UE receiving signal from the RNC by using the TMGI.

7. The method as claimed in claim 6, further comprising the steps of: after the RNC receiving TMGI,
    h) forwarding the message to the SGSN.

8. The method as claimed in claim 7, the RNC adds 1 to the number of the service's users.

9. The method as claimed in claim 7, the TMGI is included in a initial direct transmission of RNC message.

10. The method as claimed in claim 6, the creating of the TMGI comprising the steps of:
    creating a temporary identifier;
    obtaining a GGSN identifier;
    associating the GGSN identifier with the temporary identifier.

11. A method for creating and assigning Temporary Moving Group Identifier (TMGI), comprising the steps of:
    a) Sending a message to a serving GPRS Supporting Node (SGSN) when an UE joining a Multimedia Broadcast/Multicast Service (MBMS) group;
    b) if a MBMS TMGI has been added to SGSN record, the SGSN directly replying to the LYE with the TMGI corresponding to the service:
    c) if there is no record for this service in the SGSN, the SGSN sending a message to a Gateway GPRS Supporting Node (GGSN) and then the GGSN sending a response to the SGSN;
    d) the SGSN creating a TMGI for this service and responding to the UE with this TMGI;
    e) the SGSN sending a message to other SGSNs to notify them of the corresponding relation between the MBMS service and the TMGI;
    f) the LIE receiving signal from the RNC by using the TMGI.

12. The method as claimed in claim 11, further comprising the steps of: after the RNC receiving TMGI,
    g) forwarding the message to the SGSN.

13. The method as claimed in claim 12, the RNC adds 1 to the number of the service's users.

14. The method as claimed in claim 12, the TMGI is included in a initial direct transmission of RNC message.

15. The method as claimed in claim 11, the corresponding relation between the TMGI and the MBMS service are notified to other SGSNs with the aid of a newly created message; and parameters of the message include a TMGI and an IP multicast address.

* * * * *